United States Patent [19]

Hirose et al.

[11] Patent Number: 5,443,700

[45] Date of Patent: Aug. 22, 1995

[54] METHOD FOR TREATING WASTE WATER CONTAINING OIL COMPOSED OF ESTERS, AND TREATING APPARATUS THEREOF

[75] Inventors: Yasuo Hirose; Kikuo Okada, both of Hitachi, Japan

[73] Assignee: Hitachi, Ltd., Tokyo, Japan

[21] Appl. No.: 283,175

[22] Filed: Aug. 3, 1994

[30] Foreign Application Priority Data

Aug. 6, 1993 [JP] Japan .................................. 5-195817

[51] Int. Cl.$^6$ ............................................. C02F 1/461
[52] U.S. Cl. .................................... 204/149; 204/131; 210/663; 210/671; 210/680; 210/694
[58] Field of Search ................ 204/149, 131, 275, 242; 210/663, 671, 680, 694

[56] References Cited

U.S. PATENT DOCUMENTS

| 4,040,938 | 8/1977 | Robertson | 204/283 |
| 4,330,387 | 5/1982 | Astruc et al. | 204/275 |

FOREIGN PATENT DOCUMENTS 60-105997  6/1985  Japan .
3-178392  8/1991  Japan .

OTHER PUBLICATIONS

Kagaku Kougaku Benran (Chemical Engineering Handbook), 4th Ed., Maruzen Co. Tokyo, 1978, Chapter 11 (no month).
Y. Nojima et al, "Operational Experience in the Low Level Liquid Waste Treatment at Tokai Reprocessing Plant", Proceedings of Fuel Reprocessing and Waste Management, Aug. 26–29, 1984, vol. 1, pp. 505–515.
W. W. Schulz, and J. D. Navratil, "Science and Technology of Tributyl Phosphate", vol. 1, Chap. 5, CRC Press Inc. 1984 (no month).

*Primary Examiner*—John Niebling
*Assistant Examiner*—Arun Phasge
*Attorney, Agent, or Firm*—Fay, Sharpe, Beall, Fagan, Minnich & McKee

[57] ABSTRACT

A method for treating waster water containing oil composed of esters, which makes reactivation of spent adsorbent possible or unnecessary, and facilitates treatment of waste adsorbent. In order to realize the above method, oil composed of esters is adsorbed into an electroconductive adsorbent from the waste water, and is converted to water soluble materials by electrolytic hydrolysis using the adsorbent as a part of cathode for separating from and reactivating the adsorbent, or adsorbing step and reactivating step are performed concurrently. In accordance with the present invention, reactivation of spent adsorbent becomes possible and an amount of generated waste decreases remarkably, and generated waste adsorbent hitherto can be readily incinerated because of eliminating adsorbed oil. Secondary waste is not generated because no chemicals are used other than electric power.

11 Claims, 5 Drawing Sheets

METHOD FOR TREATING WASTE WATER CONTAINING OIL COMPOSED OF ESTERS, AND TREATING APPARATUS THEREOF

BACKGROUND OF THE INVENTION (1) Field of the Invention

The present invention relates to a method for treating waste water containing oil composed of esters by adsorbing the oil from the waste water which to be released to an environment, and separating the oil from adsorbent as water soluble alcohols and acids by hydrolysis.

(2) Description of the Prior Art

KAGAKU KOUGAKU BENRAN (Chemical Engineering Handbook) Rev. 4th Edition, Maruzen Co. (Tokyo) (1978), Chapter 11, teaches the following prior art; Phosphoric acid-alkylesters, phosphonic acid-alkylesters, and phophinic acid-alkylesters, and the like, having a P—O bond in their molecule have a cation exchange function, and they are used for metal extraction from their aqueous solution. Tributyl phosphate, one of phosphoric acid-alkylesters, is widely used as a practical extraction solvent for extracting heavy metal ions from their aqueous solution in uranium refining processes, reprocessing processes of spent fuel, and the like.

Tributyl phosphate has solubility of about 400 mg/l in water at room temperature, and is distilled out accompanied with water vapor from an evaporator to process the liquid effluent. Accordingly, a possibility that waste water from related plants contain a small amount of tributyl phosphate can be assumed. Tributyl phosphate in the waste water is defined as "Mineral oil which is extractable by n-hexane" by Japanese regulation law, and the maximum concentration of such mineral oil in waste water which is allowable to release in environment is required to be 5 mg/l.

Y. Nojima et al (Operational Experience in the Low Level Liquid Waste Treatment at Tokai Reprocessing Plant, Proceedings of Fuel Reprocessing and Waste Management, August 26–29 (1984), Vol. 1 pp. 505–515) teaches the following prior art; In a Japanese reprocessing plant for spent fuel, waste water is treated with active carbon for eliminating tributyl phosphate by contacting and adsorbing in order to comply with the regulation, and then is released to the environment. The spent active carbon which has adsorbed the tributyl phosphate is stored in a storage at present, and will be treated and disposed later in other processes.

Methods for eliminating oils contained in water by adsorption into active carbon have been used widely, and the method itself is sufficiently established technology. The oil adsorbed spent active carbon is heated at about 1000° C. in an oven, and can be finally reactivated by a gasification reaction. Accordingly, only deteriorated active carbon of which adsorbing capacity is decreased by repeating of the reactivation is treated for disposal. However, in case of tributyl phosphate as for the oil, the above described conventional reactivation of the active carbon can not be applied because heating of tributyl phosphate generates phosphoric acid, and consequently, spent active carbon is stored without reactivation and is accumulated. Generally speaking, waste active carbon is treated with an incinerating process first, and only ashes are disposed. However, the waste active carbon which adsorbed tributyl phosphate contains a large amount of phosphoric acid, and accordingly, it becomes necessary to be added with lime for protecting the oven wall in the incinerating process, therefore, a large amount of incineration residue containing calcium phosphate is generated.

As one of methods aiming at decomposing tributyl phosphate which was used as an extracting solvent, Schulz et al disclosed a method wherein tributyl phosphate was decomposed in butyl alcohol and water-soluble phosphoric acid compounds by heating the tributyl phosphate with 50% NaOH aqueous solution at the boiling point of 130° C., and the butyl alcohol was separated by distilling. (W. W. Schulz, and J. D. Navratil, "Science and Technology of Tributyl Phosphate", Vol. I, Chapter 5, CRC Press Inc. (1984)).

Furthermore, as a method for decomposing tributyl phosphate solution chemically, JP-A 60-105997 (1985) discloses a method wherein radioactive spent organic phosphoric esters are oxidized to decompose by being heated with hydrogen peroxide in phosphoric acid aqueous solution of copper phosphate.

The above described treating methods required usage of a large amount of chemical agents in a condensed condition at elevated temperature, and accordingly, the methods could not be used for treatment of a large amount of waste water containing a very small amount of tributyl phosphate.

Tributyl phosphate is chemically stable material, but on account of its property as an ester of phosphoric acid, it has a tendency to hydrolyze under a water existing condition into butyl alcohol and dibutyl phosphate, monobutyl phosphate, and phosphoric acid. These products are all water-soluble and are not mineral oils extractable by n-hexane.

Hydrolysis of tributyl phosphate proceeds in the following three steps such as first dibutyl phosphate is generated with butyl alcohol, subsequently monobutyl phosphate, and finally phosphoric acid is generated.

$(C_4H_9O)_3PO + H_2O \rightarrow (C_4H_9O)_2PO(OH) + C_4H_9OH$
tributyl phosphate dibutyl phosphate butyl alcohol
$(C_4H_9O)_2PO(OH) + H_2O \rightarrow C_4H_9OPO(OH)_2 + C_4H_9OH$ dibutyl phosphate monobutyl phosphate butyl alcohol
$C_4H_9OPO(OH)_2 + H_2O \rightarrow H_3PO_4 + C_4H_9OH$
monobutyl phosphate phosphoric acid butyl alcohol It is well known that hydrolysis of tributyl phosphate is accelerated by addition of acid or alkali. Under an acid existing condition, the above described hydrolytic reactions proceed parallel as primary reactions relating to concentration of each compounds, and reaction rate constants are in a ratio of about 4:2:1. The hydrolysis reaction rate constant of tributyl phosphate dissolved in 1N nitric acid aqueous solution is $4 \times 10^{-6}$/hour at 30° C., and $1 \times 10^{-4}$/hour at 60° C. Effect of nitric acid concentration on the hydrolysis reaction rate constant is scarce in a range between 1N and 8N. The hydrolysis reaction rate constant of tributyl phosphate contacting with 1N nitric acid (concentration of 0.86 gram molecule/l) is $3.3 \times 10^{-6}$/hour at 30° C., and $1.1 \times 10^{-4}$/hour at 60° C., and it does not differ so much from that of aqueous solution.

It is well known that hydrolysis of tributyl phosphate contacting with alkali aqueous solution proceeds as a primary reaction relating to concentration of tributyl phosphate and concentration of alkali in the aqueous solution, and the hydrolysis reaction hardly exceed the step of generating dibutyl phosphate. The hydrolysis reaction rate constant of tributyl phosphate dissolved in 1N sodium hydroxide aqueous solution is $5.5 \times 10^{-3}$/hour at 30° C., and $6 \times 10^{-2}$/hour at 60° C. The hydrolysis reaction rate of tributyl phosphate in alkali aqueous solution is larger than that in acid aqueous solution by about 1000 times. However, it is unrealistic to maintain a remarkably large amount of waste water to be treated in alkaline condition in consideration of a large amount of alkaline agents and secondary waste to be generated.

It is well known that hydrolysis of tributyl phosphate is accelerated by radiation exposure, and JP-A-3-178392 (1991) discloses a method wherein tributyl phosphate contained in waste water is decomposed to dibutyl phosphate by radiation exposure of the waste water. However, in order to give sufficient energy to a large amount of waste water, a large amount of radiation source is required and, consequently, it causes a problem that a large scale apparatus thereof is required.

SUMMARY OF THE INVENTION (1) Objects of the Invention:

An object of the present invention is to provide a method for treating waste water containing oil composed of esters, which is capable of eliminating the oil existing in the waste water to an extent of low concentration by using adsorbent and reducing amount of generated spent adsorbing agent.

(2) Methods of Solving the Problems:

Feature of the present invention to achieve the above described object is being provided with a means for adsorbing once the mineral oil composed of esters, which exists at a low concentration in a large amount of waste water, by adsorbent and, subsequently, for condensing the concentration of the oil in the adsorbent (first means), and a means for hydrolysing the oil composed of esters to separate from the adsorbent (second means).

The first means is fundamentally the same as the conventional one used hitherto, but the adsorbent is selected depending not on saturated adsorbing capacity, but on preferability for applying the adsorbent to the second means because incineration treatment of spent adsorbent without recycle is not an object of the present invention.

The second means is an essentially portion of the present invention, but the first means is indispensable for making the second means more effective and practicable. The second means is aimed at enhancing hydrolysis of the oil composed of esters by utilizing hydroxide ions which are generated electrochemically at cathode.

There are two ways to provide the second means; the one of which electrochemical reaction is taking place by immersing the adsorbent into catholyte, and the other of which electrode is composed of the adsorbent.

The first means and the second means can be separated and are applicable respectively, or the second means can be executed within an apparatus for executing the first means. Further, the first means and the second means can be executed concurrently. In the respective cases, respective preferable executing condition for achieving most effective performance of the present invention exists.

In case of separating the first means and the second means and executing respectively, water soluble hydrolytic products of the oil composed of esters can be released to environment. Otherwise, the hydrolytic products can be separated from the adsorbent and treated successively. In case of the first means and the second means are executed concurrently, the water soluble hydrolytic product of oil composed of esters are release to environment with the waste water.

Active carbon is used mainly for removing organic materials by adsorption from tap water, water for drinking, industrial waste water, and sewage. High molecular weight organic materials, or low molecular weight alcohol, ketone, organic acid which are hydrophilic, and the like are less absorbed by active carbon. Generally speaking, organic material having low solubility in water is more easily separable from the water by adsorption process.

As active carbon for treating waste water, there are various kinds such as fruit shell group, wood group, coal group, oil group, carbon black group, and so on, and various shapes such as fabricated in granules having appropriate sizes, or amorphous fragments. Active carbon has a two dimensional pore structure comprising macro pores of a few micron order diameter and micro pores of a few tens angstrom order diameter, porosity of about 60%, and specific surface area of about 1000 $m^2/g$. The active carbon is used in a form of filled layers, of which void fraction is about 40%.

Adsorbent for tributyl phosphate in waste water is not restricted to only active carbon, but also porous material having large internal surface which has stronger affinity to tributyl phosphate than water can be used. For instance, adsorbents composed of tetrafluoroethylene polymer, styrene divinylbenzene copolymer, glass carbon network composition, carbon fiber, felt made of carbon fiber, and composite material made of hydrophobic material and carbon. Thus, tributyl phosphate which is adsorbed in an adsorbent and condensed into a small volume can be treated for hydrolysis with very small amount of chemicals in comparing with the amount of waste water, and consuming small amount of energy.

Tributyl phosphate adsorbed in an adsorbent exists in the adsorbent filled layer by a concentration of at most 1 gram molecule/liter. Therefore, the tributyl phosphate can be eluted from the adsorbent with hydrocarbon group solvents, and subsequently, it can be treated with conventional chemical treatments such as hydrolysis by boiling with sodium hydroxide, or hydrogen peroxide decomposition method (JP-A-60-105997 (1985)) using copper phosphate as a catalyst in phosphoric acid solution. However, the present invention provides an electrochemical hydrolysis method wherein the solvent for eluting the tributyl phosphate from the adsorbent is not used, consuming amount of chemicals is small and accordingly amount of generated secondary waste is small, and operation is easy.

The electrochemical hydrolysis method depends on a principle wherein an electroconductive adsorbent which adsorbed tributyl phosphate is placed in an electrolytic cell as a part of cathode, the tributyl phosphate is hydrolyzed to water soluble dibutyl phosphate ion and butyl alcohol by the following reaction using hydroxide ion generated at boundary of the adsorbent and the aqueous electrolyte solution, and the generated water soluble dibutyl phosphate ion and butyl alcohol are separated from the adsorbent;

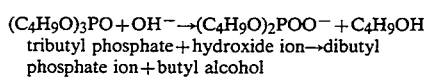

$(C_4H_9O)_3PO + OH^- \rightarrow (C_4H_9O)_2POO^- + C_4H_9OH$
tributyl phosphate + hydroxide ion → dibutyl phosphate ion + butyl alcohol Feature of the above described method is, different from general treatment using chemical agents, that the hydroxide ions are supplied not from chemical agent but electronically, and consequently, addition of excess chemical agent for maintaining high reaction rate in general chemical reaction is not necessary, but only minimum amount of chemical agent for maintaining electric conductivity to the electrolyte is required.

In implementation of the present invention, one of the important factors is an electric conductivity of the adsorbent. The electric conductivity of active carbon differs depending on raw material and heat treatment temperature, but take an example for active carbon made from oil pitch, thermally treated at about 1000° C., and having porosity of about 60% has specific electric resistance of 0.05 ohm.cm. Preferable specific electric resistance for the adsorbent used in the present invention is at most 0.1 ohm.cm.

Waste water to be treated contains occasionally strong electrolyte of 0.01-1 gram equivalent, and specific resistance from 10 ohm.cm to 1000 ohm.cm which is given to aqueous solution by dissociation of the above strong electrolyte is preferable for electrolyte used in the present invention. When waste water to be treated contains no electrolyte, the waste water is adjusted to be preferable concentration of electrolyte by adding strong electrolyte. As for the electrolyte, mineral acid salts of alkaline metals and quaternary alkylamines, and so on, are preferable. Waste water to be directly treated can be adjusted its specific electric resistance by decreasing electrolyte concentration, or adding strong electrolyte depending on its necessity.

In order to generate hydroxide ion by electrolytic reaction of water at surface of the adsorbent particles, a potential difference exceeding an overvoltage for hydrogen generation must exist between electroconductive adsorbent particles, which composing a part of cathode, and aqueous solution. And, in order to cause the electrolytic reaction homogeneously in the adsorbent particle filled layer, thickness of the adsorbent particle filled layer must be restricted at a limited length. If thickness of the adsorbent particle filled layer is increased, an amount of absorbent which can be filled in an electrolytic vessel is increased, but current efficiency may be decreased. Current transferring area in the adsorbent particle filled layer has a restriction in size because of its mechanical composing condition between electrode and separator, or the electrolytic cell, and therefore, an unit size of the electrolytic cell in this composition can not be increased more than 100-200 liters. Accordingly, it is necessary to compose an apparatus having a necessary size by combining modules having the above described unit size. Compositions of two anodes for one cathode, or one anode for two cathodes, further, repeating composition of anode and cathode made it possible to increase amount of adsorbent which can be filled in an unit size of the electrolytic cell under the restriction of the filled layer thickness and the current transferring area.

The adsorbent filled layer which composes a part of the cathode is supported in a cathode chamber which is composed of porous separator, and separated from the anode. The porous separator is made of glass powder sintered body, biscuit ware, asbestos plate, porous plastic plate, and the like.

As for the anode and the cathode, conventional materials such as platinum plated titanium, nickel, stainless steel, and the like which are used generally for electrolytic cell can be used, but especially, electroconductive carbon plate is preferable in performance, corrosion resistance, and cost.

The cation which comprises the electrolyte combines with dibutyl phosphate generated at the cathode to increase solubility, and performs an function to transfer it into the solution. In the anode chamber, cation of mineral acid which transmits through the porous separator generates mineral acid with hydrogen ion generated by hydrolysis of water, and dibutyl phosphate ion generated in the cathode chamber transmits through the porous separator and generates dibutyl phosphate. Butyl alcohol stays in the catholyte because it is a non polar compound, but it diffuses somewhat into the anolyte.

The electrolyte is homogeneous and neutral at the beginning of the reaction. However, as the reaction proceeds, anion moves into the anolyte through the porous separator and makes it acidic, and cation moves into the catholyte and makes it alkaline. Oxygen gas generated at the anode and hydrogen gas generated at cathode are separated and prevented from mixing together by the separator, and are released outside the electrolytic cell. Dibutyl phosphate is dissolved into the catholyte as a water soluble salt, but dissociated dibutyl phosphate ions move into anode chamber through the porous separator. Consequently, the catholyte is always maintained at alkaline condition, and the hydrolytic reaction is proceeded.

While tributyl phosphate adsorbed remains in the adsorbent and its hydrolysis is proceeding, hydroxide ions are consumed. However, when the hydrolysis is finished, the hydroxide ions become excess, and pH increases rapidly.

Depending on electric resistance of the electrolyte, Joule heat is generated in the electrolyte, and temperature of the electrolyte is elevated. Therefore, it is necessary to circulate the electrolyte through a heat exchanger for keeping the temperature of the electrolyte at a constant. In case of that waste water to be treated is passed through the electrolytic vessel as electrolyte, it is not necessary to consider the heat generation in general, and a simple apparatus can be used for the electrolysis.

As specific electric resistance of electrolyte aqueous solution lowers about 30% by temperature rise of 10° C., the higher is the temperature of the electrolyte maintained, the larger current can be flowed through it with a constant voltage. On the other hand, reaction rate of the hydrolysis of tributyl phosphate in alkaline aqueous solution increases by about three times with temperature rise of 10° C. Therefore, there is a tendency that current efficiency of the hydrolysis can be improved by maintaining temperature of the electrolyte high.

When circulating amount of electrolyte increases and volume of the adsorbent particle filled layer swells, an effective specific resistance of the adsorbent filled layer increases and potential difference between electrolyte decreases, and consequently, proceeding of electrochemical reaction is hindered.

Accordingly, circulating speed of the electrolyte must be controlled so as not to cause volume swelling of the adsorbent filled layer.

In implementation of the present invention, there are two methods, e.g. the one wherein tributyl phosphate is adsorbed first and subsequently treated by hydrolysis, and the other one wherein tributyl phosphate which is condensed in the adsorbent is hydrolyzed in situ in the adsorbing apparatus.

Hydrolysis treatment of the tributyl phosphate adsorbed in adsorbent is performed by transferring the adsorbent to a hydrolysis apparatus, or the adsorption apparatus itself is used as a hydrolysis apparatus, the adsorbent is regenerated, i.e. enabling the adsorbent to be used repeatedly, by separating water soluble hydrolysis product from the adsorbent, and the water soluble hydrolysis product can be treated to be a chemical form which facilitates its disposal. In this case, an adsorbent having a large saturated adsorbing capacity is advantageous because it requires for less frequent transferring operation or switching operation of the apparatus function. However, as the adsorbent is used repeatedly by regeneration, a characteristics to maintain adsorbing capacity constant after a specified hydrolysis treatment is more advantageous than the large saturated adsorbing capacity. In case of the hydrolysis apparatus and the adsorbing apparatus are independently provided, hydrolysis treatment operation can be performed either of batch process and continuous process. In case of sharing an apparatus for both hydrolysis operation and adsorbing operation, these operations are performed by batch process.

Waste liquid, i.e. electrolyte treated by electrochemical hydrolysis and separated from adsorbent, contains dibutyl phosphate, butyl alcohol, and a small amount of electrolytic material. The waste liquid itself is releasable to environment after being diluted with treated waste water. However, the waste liquid is supplied into the anode chamber partitioned with cation exchange film in the electrolytic cell and electrolyzed to recover alkaline metal hydroxides or quaternary alkylamines, and anolyte is heated to distill butyl alcohol with condensed water and finally recover phosphoric acid.

Waste active carbon separated from tributyl phosphate by electrochemical hydrolysis can be easily incinerated because of its low phosphoric acid content.

As hydrolysis reaction of tributyl phosphate in alkaline aqueous solution is the first order reaction relating to each concentration of tributyl phosphate and alkali, its reaction rate is proportional to concentration of the tributyl phosphate under a constant alkaline concentration. Accordingly, if waste water has such electroconductivity as to enable the electrolysis cell to be operable, tributyl phosphate condensed at surface of cathode composed of adsorbent contacting with waste water is electrochemically hydrolyzed at once in situ, and water soluble products of the hydrolysis become releasable with treated waste water.

In the above case, tributyl phosphate adsorbed region is generated in the adsorbent filled layer at first, but, as the adsorption is suppressed in hydrolysis proceeding region by formation of dibutyl phosphate and butyl alcohol, the adsorbed region gradually diffuses to achieve an equilibrium between the hydrolysis reaction rate and the adsorbing reaction rate, and consequently, the hydrolysis treatment becomes to be performed efficiently.

It is possible to perform adsorption and electrolysis of tributyl phosphate concurrently by using electrodes composed of electroconductive porous carbon fiber manufactured in a form of felt sheet instead of granular adsorbent, i.e. active carbon (U.S. Pat. No. 4,330,387). In the above case, a form composed of two porous carbon fiber felt sheets and two sheets of separators composed of porous insulator which are laminated alternatively and rolled in a spiral form is preferable (U.S. Pat. No. 4,040,938). In accordance with the above method, tributyl phosphate adsorbed in each of anode and cathode can be hydrolyzed homogeneously by reversing polarity of the above two electrodes periodically.

Feature of the above method is in easiness of scale up in unit capacity of adsorbing apparatus because, different from the case using granular adsorbent as the cathodic material, the spirally rolled carbon fiber felt sheet electrode does not have any restriction in size theoretically.

Hitherto, operation of the present invention is explained taking tributyl phosphate for a sample. However, the present invention is effective for treating waste water containing oil composed of general esters which generated water soluble products by hydrolysis as well as tributyl phosphate.

DETAILED DESCRIPTION OF THE EMBODIMENTS

Embodiment 1

Figure 1:
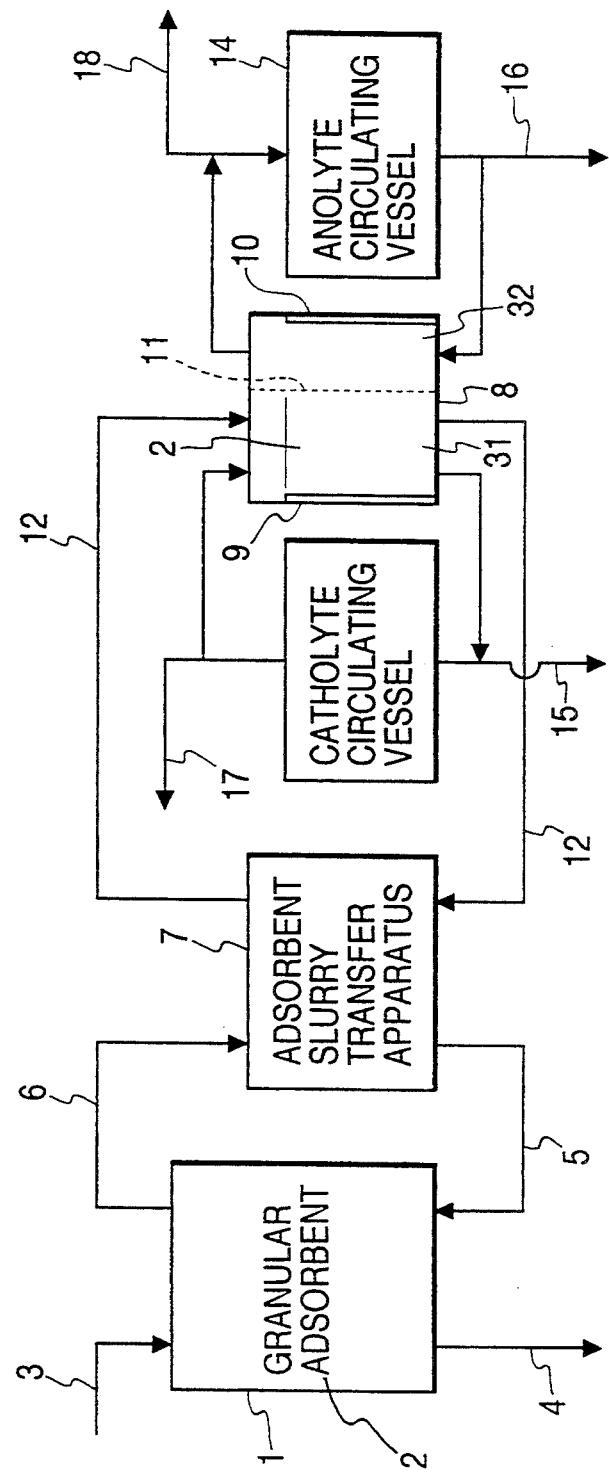
FIG. 1 is a block schematic diagram illustrating composition of a treating apparatus for waste water containing oil composed of esters relating to a preferable embodiment of the present invention.

FIG. 1 indicates composition of an embodiment of the present invention. The numerals indicates as following;

1: adsorbing apparatus, 2: granular adsorbent, 3: waste water inlet, 4: waste water outlet, 5: transferring water inlet, 6: adsorbent slurry outlet, 7: adsorbent slurry transferring apparatus, 8: electrolytic hydrolysis cell, 9: cathode, 10: anode, 11: porous separator, 12: adsorbent slurry transferring pipe, 13: catholyte circulating vessel, 14: anolyte circulating vessel, 15: catholyte drain, 16: anolyte drain, 17: hydrogen gas outlet, 18: oxygen gas outlet.

Sixty kilograms of active carbon, which was granular adsorbent 2 obtained from oil pitch as a raw material, having spherical shape granules 0.4–1 mm in diameter, 0.6 g/cc. in packed density, 1200 $m^2$/g in specific surface area, and 0.1 ohm-cm in specific electric resistance, was filled in an adsorbing apparatus 1, and 660 $m^3$ of water containing tributyl phosphate, a kind of mineral oil, by 40 mg/liter was treated by the adsorbing apparatus. Concentration of tributyl phosphate in the treated water was less than detection limit until adsorbed capacity of tributyl phosphate reached at 0.44 g/g. When taking the adsorbed capacity, 0.44 g/g, as a limit of adsorbing capacity, tributyl phosphate concentration per volume of adsorbent filled layer in the adsorbing apparatus 1 can be calculated as 266 g/liter, and consequently, tributyl phosphate in water is assumed to be concentrated to 1/66,650 in volume by the adsorbing operation. Cathode chamber 31 of the electrolytic hydrolysis cell 8 is comprised of electrically conductive carbon cathode 9 having surface area of 1 $m^2$ and partitioned by 10 cm intervals with plastic porous separator 11 having projected area of 1 $m^2$, thickness of 5 mm, and porosity of 50%, and its effective volume is 100 liters. Anode chamber 32 of the electrolytic hydrolysis cell 8 is comprised of graphite anode 10 having surface area of 1 $m^2$ and partitioned by 1 cm intervals with porous separator 11, and its effective volume is 10 litters.

Adsorbent adsorbed tributyl phosphate is transferred to the cathode chamber 31 of the electrolytic hydrolysis cell 8 as slurry by the adsorbent slurry transferring apparatus 7 with hydraulic transferring of water through the adsorbent slurry transferring pipe 12. Weight of the adsorbent in the cathode chamber 31 of the electrolytic hydrolysis cell 8 was 60 kg, and contained amount of tributyl phosphate was 26,600 g.

Two hundred liters each of sodium sulfate aqueous solution containing 0.025 gram molecule/liter was circulated to each of the anode chamber 32 and the cathode chamber 31 of the electrolytic hydrolysis cell 8 through anolyte circulating vessel 14 and catholyte circulating vessel 13, respectively, and electrolysis was performed by applying 8 volts DC between the electrodes with maintaining temperature of the electrolyte at 30° C. Consequently, current of 125 Ampere was flowed between the electrodes, and each of hydrogen gas and oxygen gas was generated from the cathode and the anode, respectively.

After 21.4 hours passed and a quantity of flowed electricity exceeded 100 Faradays, the electrolysis was terminated by stopping electric charge to the electrodes, and the electrolyte was drained. Amount of the recovered electrolyte was 190 liters, and the electrolyte was found to contain 14,700 grams of dibutyl phosphate, 5,180 grams of butyl alcohol, 340 grams of sodium sulfate. In the present embodiment, tributyl phosphate adsorbed in the adsorbent is calculated to decrease 70% current efficiency based on the amount of recovered dibutyl phosphate.

The amount of the recovered electrolyte was 1/3500 of the amount of waste water, 660 $m^3$, treated first with the treatment for adsorbing tributyl phosphate, and the recovered electrolyte could be diluted with treated waste water to include sodium sulfate 0.5 mg/liter, dibutyl phosphate 22 mg/liter, butyl alcohol 8 mg/liter, and tributyl phosphate less than detection limit.

In accordance with the present embodiment, following advantages are realized in the method for treating waste water containing oil composed of esters, and the treating apparatus thereof in comparison with the prior art wherein the oil is adsorbed by adsorbent to be separated from waste water without reactivation of the spent adsorbent and disposal of waste adsorbent causes both technical and economical burden;

(1) Spent adsorbent which adsorbed and separated tributyl phosphate from waste water can be reactivated, and generating amount of waste adsorbent can be remarkably decreased. Furthermore, tributyl phosphate can be removed from the waste adsorbent so as to enable the waste adsorbent to be calcined easily.

(2) The reactivation of the spent adsorbent can be achieved in remarkably shorter time than operating time of the spent adsorbent.

(3) The reactivation requires predominatingly electric power, even if chemicals are required, its amount is extremely small. Accordingly, waste including generated products are releasable to environment.

(4) In accordance with the method relating to the present invention, all operation can be performed at room temperature under normal pressure, apparatus are small and simple, and remote operation can be performed easily because electrolytic hydrolysis has simple reaction control factors.

(5) Electric power necessary for treatment of waste water is small per treating amount of the waste water. For example in an embodiment, about 0.05 kWh/$m^3$ for a case when waste adsorbent was separately treated, and about 0.25 kWh/$m^3$ for a case when adsorption and hydrolysis are performed concurrently.

(6) Depend on necessity, hydrolysis products of tributyl phosphate can be decomposed finally to phosphoric acid and butyl alcohol, and used chemicals can be recovered.

(7) Adsorption and separation of tributyl phosphate from waste water and hydrolysis treatment of the tributyl phosphate can be performed concurrently.

(8) Fouling of adsorbent such as the one caused by microorganism can be eliminated easily by reversing polarity of electrodes.

Embodiment 2

In the cathode chamber 31 of the electrolytic hydrolysis vessel 8 shown in FIG. 1 and explained in the above embodiment 1, 60 kg of active carbon adsorbed tributyl phosphate as explained in the embodiment 1 was filled. Electrolysis of waste water containing sodium nitrate 0.01 gram molecule/liter and tributyl phosphate 40 mg/liter was performed in a flowing condition with 0.2 $m^3$/hour through the anode chamber 32 and the cathode chamber 31 of the electrolytic hydrolysis cell 8 by applying 8 Volts DC between electrodes. Twenty five amperes of current flowed, and hydrogen gas and oxygen gas were generated at the cathode 9 and the anode 10, respectively.

After 153 hours passed and a quantity of flowed electricity exceeded 143 Faradays, the electrolysis was terminated by stopping electric charge to the electrodes, and concentration of phosphorus in the active carbon was determined. The concentration of phosphorus was 0.3%, which corresponded to 5% of that before electrolytic hydrolysis. Total amount of the recovered electrolyte was 21.4 $m^3$, and the electrolyte contained in average 850 mg/liter of sodium nitrate, 980 mg/liter of dibutyl phosphate, 345 mg/liter of butyl alcohol, but tributyl phosphate was not detected.

In the present embodiment, a period for reactivation of the adsorbent was 153 hours while adsorbing period by the adsorbent was 825 hours.

The same advantages as the embodiment 1 can be obtained by the present embodiment.

Embodiment 3

In the cathode chamber 31 of the electrolytic hydrolysis vessel 8 shown in FIG. 1 and explained in the above embodiment 1, 60 kg of active carbon as explained in the embodiment 1 was filled. Water containing 40 mg/liter of tributyl phosphate was flowed through the cathode chamber 31 by a flow rate of 8 m/hour (0.8 m$^3$/liter) for 34 days. Supply of the water was terminated at a point where concentration of tributyl phosphate in treated water reached finally at 5 mg/liter.

Electrolysis was performed with circulating 200 liters of water containing 0.01 gram molecule/liter of tetramethyl ammonium and 0.005 gram molecule/liter of sulfuric acid through the anode chamber 32 and the cathode chamber 31 of the electrolytic hydrolysis cell 8 by applying 8 Volts DC between electrodes with keeping the electrolyte temperature at 30° C. One hundred amperes of current flowed, and hydrogen gas and oxygen gas were generated at the cathode 9 and the anode 10, respectively.

After 38.3 hours passed, a quantity of flowed electricity exceeded 143 Faradays, and pH of catholyte increased rapidly, the electrolysis was terminated by stopping electric charge to the electrodes, and the electrolyte was drained. Amount of the recovered electrolyte was 190 liters, and the electrolyte contained 18900 grams of dibutyl phosphate, 6660 grams of butyl alcohol, 231 grams of tetramethyl ammonium sulfate. In the present embodiment, tributyl phosphate adsorbed into the adsorbent was assumed to be decreased by an efficiency of 95% based on the recovered amount of dibutyl phosphate.

Electrolytic hydrolysis of the recovered electrolyte was performed by circulating the electrolyte to an anode chamber in another electrolysis cell separated by cation exchange membrane and using 0.1 gram molecule/liter sulphuric acid aqueous solution as catholyte. Tetramethyl ammonium sulfate was recovered at the cathode, and the sulfate was used at following electrolytic hydrolysis. Anolyte was added with phosphoric acid, heated, hydrolyzed, and finally condensed to phosphoric acid concentrated solution with recovering butyl alcohol accompanying with condensed water.

After 30 days since water containing 40 mg/liter tributyl phosphate was started to pass again through the electrolytic hydrolysis cell, concentration of tributyl phosphate in the treated water increased to 5 mg/liter. From the present embodiment, adsorption performance of the active carbon was determined to be recovered about 90% by the electrolytic hydrolysis processing.

The same advantages as the embodiment 1 can be obtained by the present embodiment.

Embodiment 4

Figure 2:
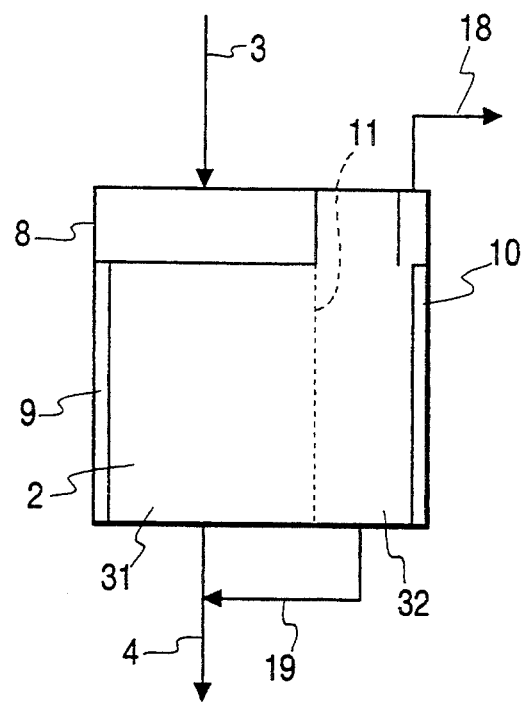
FIG. 2 is a schematic illustration indicating composition of an electrolytic hydrolysis apparatus for waste water containing oil composed of esters relating to fourth embodiment of the present invention.

FIG. 2 is a schematic illustration for explaining the embodiment 4 relating to the present invention. The numerals in FIG. 2 indicates followings;

2: granular adsorbent, 3: waste water inlet, 4: waste water outlet, 8: electrolytic hydrolysis cell, 9: cathode, 10: anode, 11: porous separator, 20: oxygen gas outlet, and 21: anolyte outlet.

Sixty kilograms of same active carbon as explained in the embodiment 1 was filled into a cathode chamber 31 of the electrolytic hydrolysis cell 8. Waste water containing tributyl phosphate by 40 mg/liter and sodium nitrate by 0.01 gram molecule/liter was treated by passing through the cathode chamber 31 with a flow velocity of 8 m/hour (0.8 m$^3$/hour). Concurrently, 8 volts DC was applied between a cathode 9 and the anode 10, and 25 Ampere DC was flowed.

Treated water flowed out from the cathode chamber 31 into the anode chamber 32 through the porous separator 11, and further entered into the treated water outlet 4 through the anolyte drain pipe 21. Oxygen generated at the anode 10 was collected at upper portion of the anode chamber 32, and released from the oxygen gas outlet 20. Hydrogen gas generated at the cathode 9 and the granular adsorbent 2 was released from treated water outlet 4 with running treated water.

After first 24 hours, 16 mg/liter of dibutyl phosphate, 5 mg/liter of butyl alcohol, and 850 mg/liter of sodium nitrate were detected in the treated water, but tributyl phosphate was not detected. Current efficiency during the above period for hydrolysis reaction of tributyl phosphate was 7%.

After 672 m$^3$ of waste water was treated in 35 days, 32 mg/liter of dibutyl phosphate, 11 mg/liter of butyl alcohol, and 850 mg/liter of sodium nitrate were detected in the treated water, but tributyl phosphate was not detected.

Current efficiency for hydrolysis reaction of tributyl phosphate determined based on concentration of dibutyl phosphate remaining in the treated water was 14%.

The same advantages as the embodiment 1 can be obtained by the present embodiment.

Embodiment 5

Figure 3:
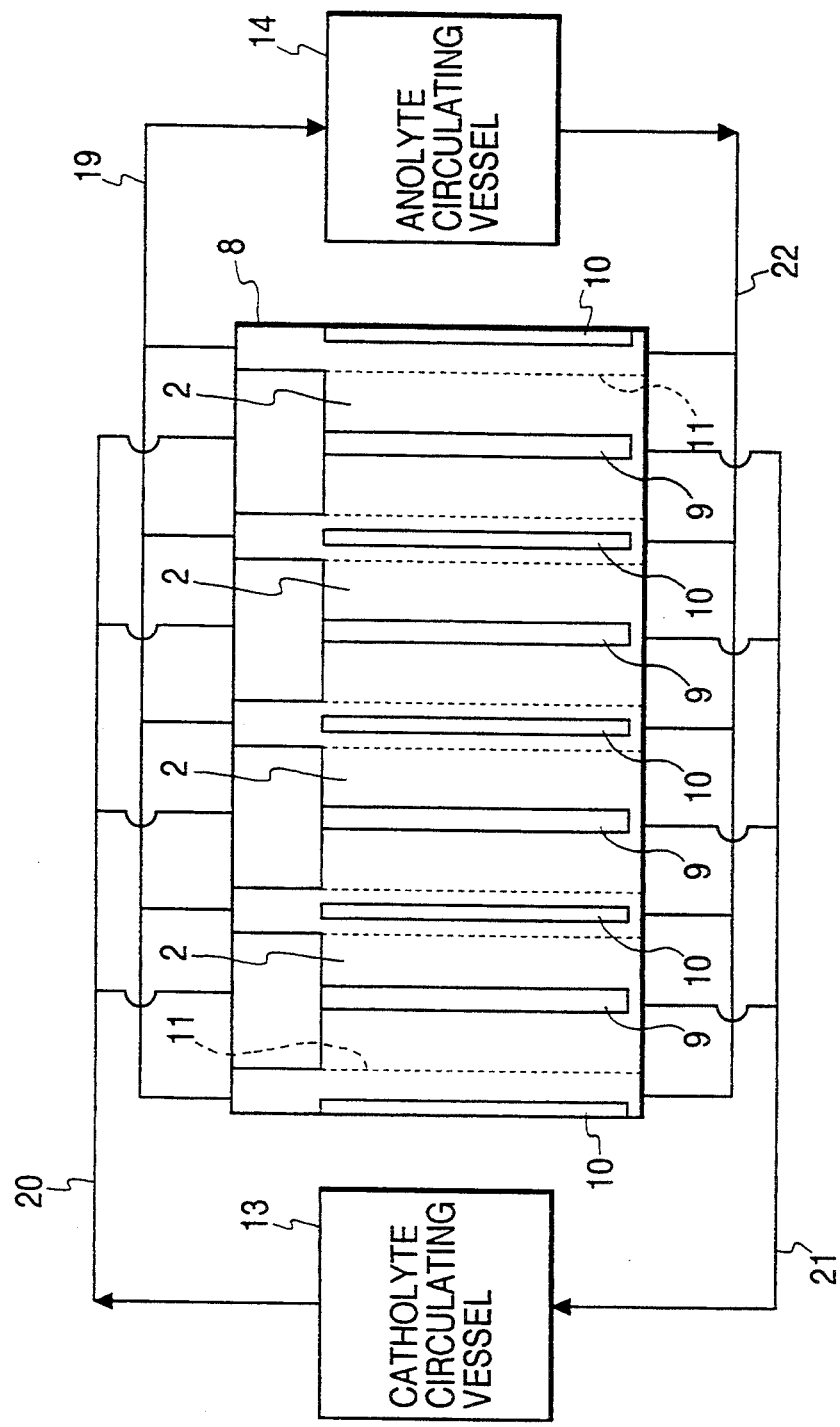
FIG. 3 is a block schematic diagram illustrating composition of a treating apparatus for waste water containing oil composed of esters relating to fifth embodiment of the present invention.

FIG. 3 is a schematic illustration for explaining the embodiment 5 relating to the present invention. The numerals in FIG. 3 indicates followings;

2: granular adsorbent, 8: electrolytic hydrolysis cell, 9: cathode, 10: anode, 11: porous separator, 19: catholyte inlet pipe, 20: catholyte outlet pipe, 21: anolyte outlet pipe, and 22: anolyte inlet pipe.

Feature of the present embodiment is in capability of increasing treating capacity per electrode in an electrolytic hydrolysis cell 8 by incorporating plural pairs of the cathode 9 and the anode 10 into the electrolytic hydrolysis cell 8.

The same advantages as the embodiment 1 can be obtained by the present embodiment.

Sixty kilograms of same active carbon as explained in the embodiment 1 was filled into a cathode chamber 31 of the electrolytic hydrolysis cell 8. Waste water containing tributyl phosphate by 40 mg/liter and sodium nitrate by 0.01 gram molecule/liter was treated by passing through the cathode chamber 31 with a flow velocity of 8 m/hour (0.8 m$^3$/hour). Concurrently, 8 volts DC was applied between a cathode 9 and the anode 10, and 25 Ampere DC was flowed.

Treated water flowed out from the cathode chamber 31 into the anode chamber 32 through the porous separator 11, and further entered into the treated water outlet 4 through the anolyte drain pipe 21. Oxygen generated at the anode 10 was collected at upper portion of the anode chamber 32, and released from the oxygen gas outlet 20. Hydrogen gas generated at the cathode 9 and the granular adsorbent 2 was released from treated water outlet 4 with running treated water.

After first 24 hours, 16 mg/liter of dibutyl phosphate, 5 mg/liter of butyl alcohol, and 850 mg/liter of sodium nitrate were detected in the treated water, but tributyl phosphate was not detected. Current efficiency during the above period for hydrolysis reaction of tributyl phosphate was 7%.

After 672 m$^3$ of waste water was treated in 35 days, 32 mg/liter of dibutyl phosphate, 11 mg/liter of butyl alcohol, and 850 mg/liter of sodium nitrate were detected in the treated water, but tributyl phosphate was not detected.

Current efficiency for hydrolysis reaction of tributyl phosphate determined based on concentration of dibutyl phosphate remaining in the treated water was 14%.

The same advantages as the embodiment 1 can be obtained by the present embodiment.

Embodiment 6

Figure 4:
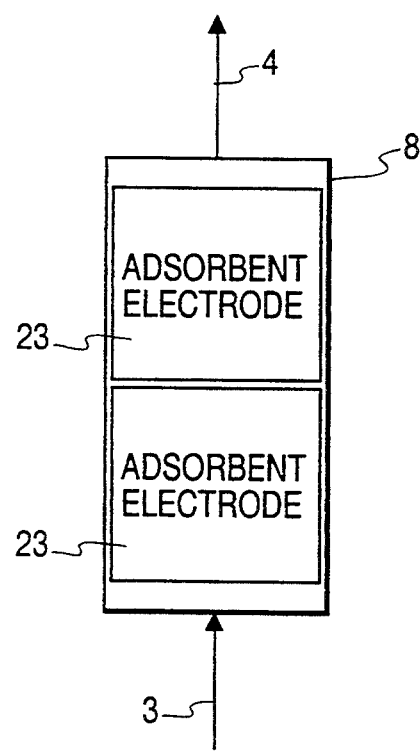
FIG. 4 is a schematic illustration indicating composition of an electrolytic hydrolysis apparatus for waste water containing oil composed of esters relating to sixth embodiment of the present invention.

FIG. 4 is a schematic illustration for explaining the embodiment 6 relating to the present invention. The numerals in FIG. 4 indicate followings;

3: waste water inlet, 4: waste water outlet, 8: electrolytic hydrolysis cell, 23: adsorptive electrode.

Figure 5:
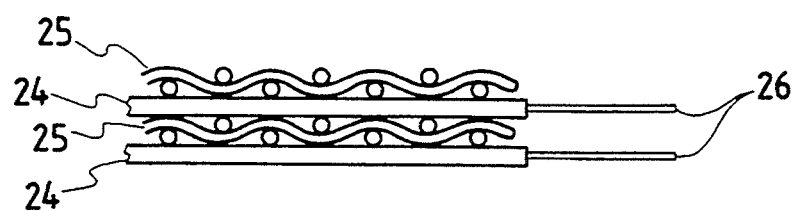
FIG. 5 is a top plan view indicating detail of a part of adsorptive electrode shown in FIG. 4.
Figure 6:
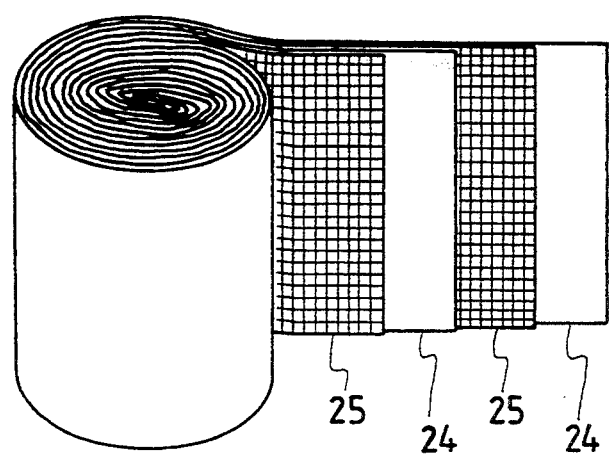
FIG. 6 is a perspective view of the adsorptive electrode shown in FIG. 5.

FIGS. 5 and 6 are schematic illustrations for explaining detail of the adsorptive electrode 23 shown in FIG. 4, and the numerals indicate the followings;

24: electrode composed of porous fiber felted sheet, 25: insulating sheet composed of porous plastics, and 26: lead for supplying voltage to the respective electrode.

The electrodes are operated with waste water flowing along center of the circinate electrodes, and a voltage applying to one electrode as an anode and the other as a cathode.

Figure 7:
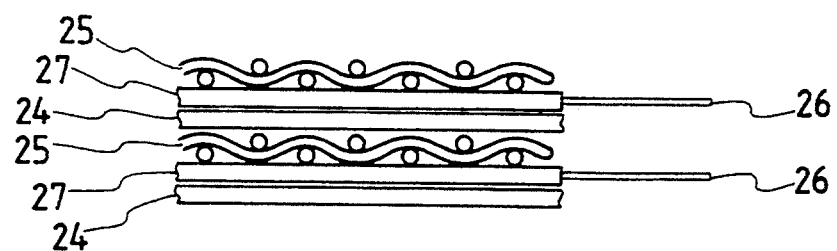
FIG. 7 is a top plan view indicating detail of a part of adsorptive electrode shown in FIG. 4.
Figure 8:
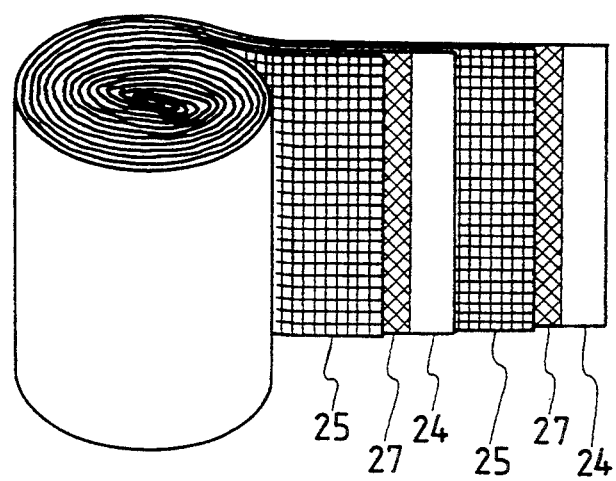
FIG. 8 is a perspective view of the adsorptive electrode shown in FIG. 7.

FIGS. 7 and 8 are other schematic illustrations for explaining detail of the adsorptive electrode 23 in FIG. 4, and the numerals indicate the followings;

24: electrode composed of porous fiber felted sheet, 25: insulating sheet composed of porous plastics, 27: current feeder net for supplying voltage to the respective electrode, and 26: lead for supplying voltage to the respective current feeder.

The electrodes are operated as same as the adsorptive electrode shown in FIGS. 5 and 6 with waste water flowing along center of the circinate electrodes, and a voltage applying to one electrode as an anode and the other as a cathode.

Because the anode and the adjacent cathode are separated only the thin porous insulating sheet or the porous insulating sheet and the current feeder net, current can be flowed by a low voltage even though the waste water has high electric resistance. Minute oxygen gas bubbles generated at wide anode surface can dissolve into waste water readily, but hydrogen gas is released with waste water. Therefore, it is necessary to treat the waste water finally for ensuring safety by diluting the hydrogen gas and so on. When waste water containing 40 mg/liter of tributyl phosphate is treated quantitatively by the electrochemical treatment, about 1.611 liters of hydrogen gas per 1 m$^3$ of waste water is generated by the treatment.

Tributyl phosphate adsorbed in the anode can be treated with hydrolysis by reversing polarity of electrodes periodically with flowing the waste water. Further, organic fouling on the electrodes caused by attached microorganism and others can be eliminated by oxidizing decomposition with oxygen generated at the electrode working as an anode.

The same advantages as the embodiment 1 can be obtained by the present embodiment.

In accordance with the present invention, concentration of mineral oil composed of esters in waste water can be lowered significantly, and an amount of spent adsorbent generation can be decreased remarkably.

What is claimed is;

1. A method for treating waste water containing oil composed of esters comprising the steps of;
   adsorbing the oil in a solid adsorbent by contacting with the adsorbent, and
   separating the adsorbed oil from the adsorbent by hydrolyzing the oil to water soluble alcohol and water soluble acid.

2. A method for treating waste water as claimed in claim 1, wherein said adsorbent is electroconductive having specific resistance of less than 0.1 ohm-cm, and is reactivated by the steps of;
   immersing the oil adsorbed adsorbent into catholyte, which is an electrolyte aqueous solution, in a electrolysis cell, and
   flowing direct current between the catholyte and anolyte, which is an electrolyte aqueous solution, in said electrolysis cell through a porous separator for separating the adsorbed oil from said adsorbent by hydrolyzing the adsorbed oil to water soluble alcohol and water soluble acid.

3. A method for treating waste water as claimed in claim 2, wherein said electrolyte included in the electrolyte aqueous solution is a salt of mineral acid with the one selected from alkali metals and quaternary alkylamines, and specific electric resistance of the electrolyte aqueous solution is in a range from 10 ohm-cm to 1000 ohm-cm at room temperature.

4. A method for treating waste water as claimed in claim 3, wherein said electrolyte aqueous solution is waste water to be treated, and the waste water flows in said electrolysis cell as an electrolyte aqueous solution.

5. A method for treating waste water as claimed in claim 2, wherein acid composing said ester is collected in anolyte and alcohol composing said ester is remained in catholyte, and said acid and said alcohol are treated separately or together.

6. A method for treating waste water as claimed in claim 1, wherein the steps for adsorbing and electrolyzing are concurrently performed.

7. An apparatus for treating waste water containing oil composed of esters comprising;
   adsorbing apparatus filled inside with adsorbent for adsorbing said oil composed of esters contained in said waste water,
   electrolytic apparatus for separating said oil composed of esters from the adsorbent by hydrolysis, and
   supplying means for supplying said adsorbent adsorbed oil composed of esters from said adsorbing apparatus to said electrolytic apparatus.

8. An apparatus for treating waste water as claimed in claim 7, wherein at least one cathode and at least two anodes are arranged alternately in said electrolytic apparatus, or at least one anode and at least two cathodes are arranged alternately in said electrolytic apparatus.

9. An apparatus for treating waste water as claimed in claim 7, wherein said cathode arranged in said electrolytic apparatus comprises said adsorbent.

10. An apparatus for treating waste water as claimed in claim 7, wherein the anodes and the cathodes are arranged in said electrolytic apparatus, said anodes are composed of same electroconductive adsorbent as said cathodes, and said anodes and said cathodes are arranged alternately in an overlapped stratifying form holding porous insulating separator respectively between said anode and said cathode.

11. An apparatus for treating waste water as claimed in claim 7, wherein said adsorbing apparatus and said electrolytic apparatus are common.

* * * * *